(12) United States Patent
Sugizaki et al.

(10) Patent No.: US 6,544,641 B2
(45) Date of Patent: Apr. 8, 2003

(54) SILICATE-CONTAINING SHEET

(75) Inventors: Toshio Sugizaki, Omiya (JP); Shunsaku Node, Toda (JP); Toshifumi Kageyama, Yokosuka (JP); Osamu Moriya, Yokohama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/891,660

(22) Filed: Jun. 27, 2001

(65) Prior Publication Data

US 2001/0051262 A1 Dec. 13, 2001

Related U.S. Application Data

(63) Continuation of application No. 09/093,716, filed on Jun. 9, 1998, now Pat. No. 6,284,364.

(30) Foreign Application Priority Data

Jun. 23, 1997 (JP) ............................................ 9-165546

(51) Int. Cl.[7] .................................................. B32B 7/12
(52) U.S. Cl. ................ 428/343; 359/361; 428/355 AC; 428/446; 428/451
(58) Field of Search ................................. 428/331, 343, 428/446, 451, 355 AC; 524/443, 492, 493, 442; 359/361

(56) References Cited

U.S. PATENT DOCUMENTS

| 5,342,876 A | * | 8/1994 | Abe et al. ..................... 524/493 |
| 5,476,696 A | * | 12/1995 | Papazian et al. ............ 428/34.4 |
| 5,480,722 A | * | 1/1996 | Tomonaga et al. .......... 428/428 |
| 5,681,650 A | * | 10/1997 | Peiffer et al. ................ 428/212 |

\* cited by examiner

Primary Examiner—D. S. Nakarani
(74) Attorney, Agent, or Firm—Oblon, Spivak, McClelland, Maier & Neustadt, P.C.

(57) ABSTRACT

There are disclosed a silicate-containing sheet which comprises a silicate of one metal or at least two composite metals, which metal and metals are selected from the group consisting of the groups 4 to 13 series 4-metals of the periodic table, the groups 4 to 15 series 5-metals of the periodic table, and the lanthanoids series metals, and are preferably selected from the group consisting of Ti, Fe, Co, Ni, Cu, Zn, Ga, Zr, Ag, In, Sn, Sb and Ce; and further a label comprising the above silicate-containing sheet. The silicate-containing sheet mentioned above can afford a functional sheet which has catalytic actions such as ultraviolet rays-attenuating properties, antimicrobial properties and antifouling properties at a low manufacturing cost.

4 Claims, No Drawings

SILICATE-CONTAINING SHEET

This application is a Continuation of application Ser. No. 09/093,716 filed on Jun. 9, 1998, now U.S. Pat. No. 6,284,364 B1.

BACKGROUND OF THE INVENTION

1. Field of the Invention

The present invention relates to a silicate-containing sheet. More particularly, the present invention pertains to a silicate-containing sheet which comprises a silicate having ultraviolet rays-attenuating effects, and photocatalytic actions such as antimicrobial actions and antifouling properties, and which is favorably employed in a field in which the aforesaid actions and properties are required.

2. Description of the Related Arts

It has heretofore been known that some kinds of metal oxides have ultraviolet rays scattering-actions, and they are employed as a raw material for cosmetics by taking advantage of such actions. For example, there are used finely pulverized titanium dioxide and zinc oxide, hybrid inorganic powders produced by compositely treating finely pulverized titanium dioxide with an iron oxide and finely pulverized hybrid inorganic powders produced by bringing selenium oxide and amorphous silica into composite form, as raw materials of cosmetics for finishing such as foundations, lipsticks and lip-creams.

On the other hand, it is known that titanium dioxide among a variety of metal oxides has both the above-mentioned ultraviolet rays scattering-action and a strong photocatalytic action. By the photocatalytic action for example optical energy is absorbed, thereby generating ionized oxygen molecules and as a result, an organic matter is subjected to oxidative decomposition. Examples of the hitherto known compounds having such a photocatalytic action (hereinafter sometimes referred to as "photocatalyst") include in the first place, titanium dioxide, strontium titanate ($SrTiO_3$), barium titanate ($BaTi_4O_4$), sodium titanate ($Na_2Ti_6O_{13}$), cadmium sulfide, zirconium dioxide and $\alpha$-$Fe_2O_3$. Of these, titanium dioxide is typical.

In this connection, it is made possible to impart the surface of a material with a function of decomposing an organic matter by light irradiation only, provided that the aforesaid photocatalyst is in advance, applied to the surface of a material or incorporated in the coating on the surface of a material. The foregoing photocatalyst is begun to be put into practice in the fields of glass and tiles that are less apt to be stained, a toilet bowl and the like. In addition, research and development are carried out in a positive manner for a variety of functional products by utilizing the photocatalyst. For example, investigation is being made on the commercialization of, for example, (1) glass which is coated on the surface thereof, with a transparent photocatalyst, thus is capable of spontaneously decomposing the stain stuck to the surface thereof and also is imparted with an antimicrobial effect; (2) a building material capable of decomposing nitrogen oxides that are prime evils leading to air pollution by means of the solar optical energy; (3) an effluent water treatment agent comprising silica-gel particles coated with fine powders of titanium dioxide; and the like.

As mentioned hereinbefore, titanium dioxide has both an excellent ultraviolet rays scattering-action and a strong photocatalytic action. However when titanium dioxide is applied to or mixed into a plastic substrate in order to impart these functions to the plastic, a problem is caused in which the plastic substrate is deteriorated by the strong photocatalytic action of the titanium dioxide.

In order to solve such a problem, there has recently been developed a microcapsule in which titanium dioxide is covered with silica, and an attempt is made to impart deodorizing and antimicrobial functions by mixing the microcapsule in a plastic substrate. Since in the aforesaid microcapsule, the titanium dioxide is not exposed on the surface thereof, the deterioration of the plastic is suppressed, and an organic matter having small molecules can enter inside the microcapsule through numerous micropores that are present on the surface thereof, whereby the catalytic function is effectively exhibited. Nevertheless, the microcapsule of such a structure suffers from the disadvantage that troublesome operations are needed in the production thereof, thus bringing about a high production cost.

Moreover in the case of coating the surface of the substrate with an metal oxide such as titanium oxide, the resultant coating is readily peeled off therefrom if the metal oxide is applied as such. Such being the case, there is usually adopted a method in which a binder layer such as a silica film is placed on the surface of the substrate and then a mixture of the metal oxide and a binder is applied to the binder layer. However in the aforestated method, it is necessary to install a binder layer and also prepare a binder to be mixed with the metal oxide, thus bringing about a high production cost. Moreover, in the case where the metal oxide is titanium oxide and the substrate is a plastic, some problems still remain unsolved, for example, it is inevitable that the deterioration of the substrate is accelerated even if a binder layer is placed on the surface of the substrate.

It being so, if it is possible to develop a specific substance which is imparted with ultraviolet rays-attenuating function, antimicrobial action and a photocatalytic function, which is applicable to a plastic substrate without causing the deterioration of the plastic substrate without needing a binder layer or a binder and further which is inexpensive, then it can be expected that the utilization of said substance in plastics drastically expands the usage of a functional product having ultraviolet rays attenuating properties, and photocatalytic functions such as antimicrobial properties and antifouling properties.

SUMMARY OF THE INVENTION

Under such circumstances, the object of the present invention is to provide a functional product, especially a functional plastic product which has ultraviolet rays-attenuating properties, and photocatalytic functions such as antimicrobial properties and antifouling properties and further which is inexpensive in its production cost.

As a result of intensive research and investigation accumulated by the present inventors in order to develop the foregoing functional product, it has been found that some kinds of metal silicates are imparted with a ultraviolet rays-attenuating function, an antimicrobial action and a photocatalytic function; are applicable to a plastic substrate without causing the deterioration of the plastic substrate without needing a binder layer or a binder; and further are producible at a low cost. It has also been found that a sheet comprising said metal silicate can conform to the foregoing object. The present invention has been accomplished by the aforestated findings and information.

That is to say, the present invention provides a silicate-containing sheet which comprises a silicate of one metal or at least two composite metals, said metal and composite metals being selected from the group consisting of the groups 4 to 13 series 4-metals in the periodic table, the groups 4 to 15 series 5-metals in the periodic table, and lanthanoids series metals.

DESCRIPTION OF THE PREFERRED EMBODIMENTS

There is employed, as a metal silicate in the silicate-containing sheet according to the present invention, a silicate of a metal selected from the group consisting of the groups 4 to 13 series 4-metals in the periodic table, the groups 4 to 15 series 5-metals in the periodic table, and lanthanoids series metals. Examples of the groups 4 to 13 series 4-metals in the periodic table, include the metals each having an atomic number in the range of 22 to 31, that is, Ti, V, Cr, Mn, Fe, Co, Ni, Cu, Zn and Ga. Examples of the groups 4 to 15 series 5-metals in the periodic table, include the metals each having an atomic number in the range of 40 to 51, that is, Zr, Nb, Mo, Tc, Ru, Rh, Pd, Ag, Cd, In, Sn and Sb. Examples of the lanthanoids series metals include the metals each having an atomic number in the range of 57 to 71, that is, La, Ce, Pr, Nd, Pm, Sm, Eu, Gd, Tb, Dy, Ho, Er, Tm, Yb and Lu, of which La, Ce, Pr and Nd are preferable.

Among the above-exemplified metals are preferable Ti, Fe, Co, Ni, Cu, Zn, Ga, Zr, Ag, In, Sn, Sb and Ce from the viewpoints of the performances of the silicates to be obtained and easiness of procurement. The silicate according to the present invention may be a silciate of one metal and may be a silicate of at least two composite metals, which metal and metals are selected from the group consisting of the above-exemplified metals.

The process for producing the silicate is not specifically limited, but may be in accordance with a conventional well-known process. Specifically, the objective silicate is obtainable by allowing sodium orthosilicate, sodium metasilicate, water-glass, a silicic acid which is derived therefrom, a tetraalkoxysilane or the like to react with the compound of any of the metals as mentioned above which is reactive with the aforesaid silicate, and which is specifically exemplified by a chloride, a nitrate, a sulfate, an alkoxy compound and the like of said metal. The compound of said metal, when being an acidic compound such as a chloride, a nitrate and a sulfate, can be reacted with sodium orthosilicate, sodium metasilicate, water glass, a silicic acid and a tetraalkoxysilane. However, the compound of said metal, when being a neutral compound such as an alkoxy compound, is preferably reacted with a silicic acid or a tetraalkoxysilane. The kind of said compound of the metal may be suitably selected for use in accordance with the kind of the metal to be used.

The foregoing silicate may be prepared in advance, and in the case of forming a coat layer on a substrate as described hereunder, the silicate may be prepared simultaneously with the formation of the coat layer. The silicate-containing sheet of the present invention may comprise only one silicate or at least two silicates in combination. The average particle diameter of the silicate is in the range of usually 0.01 to 10 $\mu$m, preferably 0.1 to 1 $\mu$m.

The foregoing metal silicate has a ultraviolet ray-attenuating function, an antimicrobial action and a moderate degree of photocatalytic function (antifouling properties and a photocatalytic action). The excellent characteristics of said metal silicate that are fundamentally different from the conventional titanium dioxide include that even if a plastic is used as the substrate, said metal silicate scarcely accelerates the deterioration of the plastic; that in the case of coating a substrate with said metal silicate, the coating itself has self-adhesiveness, thereby dispensing with installing a binder layer on the substrate; and further that a binder need not be contained in the coat layer. It goes without saying that a binder layer may be installed on the substrate in order to further enhance the adhesivity between the substrate and the coat layer comprising said metal silicate.

The substrate to be used in the sheet according to the present invention can be selected for use from a variety of materials without specific limitation. Preferably usable materials for the substrate are glass, a plastic film, paper, cellophane and the like, of which a plastic film is particularly preferable. Examples of the aforesaid plastic film include polyester-based film such as polyethylene terephthalate film, polybutylene terephthalate film and polyethylene naphthalate film; polyolefin-based film such as polyethylene film and polypropylene film; cellulose-based film such as diacetyl cellulose film and triacetyl cellulose film; polyvinyl alcohol film; ethylene/vinyl acetate copolymer film; polyvinyl chloride film; polyvinylidene chloride film; polystyrene film; polycarbonate film; polyamide film; and acrylic resin film. The thickness of the above-cited plastic film is not specifically limited, but is properly selected according to the situation, and it is in the range of usually 5 to 500 $\mu$m, preferably 25 to 250 $\mu$m.

The above-described substrate is properly selected in accordance with the the purpose of use of the silicate-containing sheet. In the case where the plastic film is used as the substrate and a coat layer comprising the silicate is placed thereon, said film may as desired, be surface-treated in order to enhance the adhesivity between the plastic film and the coat layer. The surface treatment can be roughly divided into a method in which the film surface is polarized by a chemical or physical method and a method in which the film surface is brought into unevenness.

The method in which the film surface is polarized by a chemical method is exemplified by chromic acid treatment, nitric acid treatment, perchloric acid treatment and a treatment with an alkali such as sodium hydroxide and potassium hydroxide. The method in which the film surface is polarized by a physical method is exemplified by surface oxidation treatments such as corona discharge treatment, flame treatment, hot air treatment, ozone/ultraviolet rays irradiation treatment and ultraviolet rays irradiation treatment utilizing the photocatalytic action of titanium dioxide. The method in which the film surface is brought into unevenness is exemplified by a sandblasting method and a solvent treatment method.

The surface treatment method is properly selected according to the kind of the film to be used. In the case of for example using polyester-based film or polycarbonate film, it is advantageous to polarize the surface with an alkali treatment.

In the case of installing a coat layer comprising the silicate on the surface of the substrate in the present invention, a binder layer may be placed as desired, in order to enhance the adhesivity between the substrate and the coat layer. A silane-based coupling agent for example can be preferably used in the formation of the binder layer. The silane-based coupling agent can be properly selected for use from the well known coupling agents, and is specifically exemplified by trimethoxysilane, triethoxysilane, vinyltris-($\beta$-methoxyethoxy)silane, $\gamma$-methacryloxypropyltrimethoxysilane, $\gamma$-glycidoxypropyltrimethoxysilane, $\beta$-(1,1-epoxycyclohexyl)ethyltrimethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-aminopropyltriethoxysilane, N-phenyl-$\gamma$-aminopropyltrimethoxysilane, $\gamma$-mercaptopropyltrimethoxysilane, $\gamma$-chloropropyltrimethoxysilane, $\gamma$-aminopropyltrimethoxysilane, $\gamma$-aminopropyl-tris(2-methoxyethoxy)-silane, N-methyl-$\gamma$-aminopropyltrimethoxysilane, N-vinylbenzyl-$\gamma$-aminopropyltriethoxysilane, triaminopropyltrimethoxysilane, 3-ureidopropyltrimethoxysilane, 3-(4,5-dihydroimidazolyl) propyltriethoxysilane, hexamethyldisilazane and N,N-bis(trimethylsilyl)urea. The thickness of the binder layer is usually in the range of 0.1 to 1 $\mu$m, approx.

The silicate in the silicate-containing sheet according to the present invention may be applied to the substrate, or may be mixed in the substrate, or may be mixed in an adhesive layer when being provided on one side of the substrate. The silicate mixed in an adhesive layer is not expected to exert a photocatalytic function such as antimicrobial properties or antifouling properties, since the adhesive layer is not exposed in usual usage, but it can exert a ultraviolet rays-attenuating function.

The coat layer comprising the silicate, when being placed on the surface of the substrate, may be placed by a method (I) comprising coating the substrate with the coating solution which has been produced by dissolving or dispersing in a suitable solvent, a desired metal-silicate prepared in advance by the use of a bar coater, a roll coater, a gravure coater or the like, and thereafter subjecting the resulting coat to drying treatment, or may be placed by an alternative method (II) comprising coating the substrate with the coating solution which has been produced by dissolving in a suitable solvent, sodium orthosilicate, sodium metasilicate, water glass, a silicic acid derived from any of the foregoing, tetraalkoxysilane or the like along with a desired metal compound which is reactive with the above-mentioned silicon-based compound and which is exemplified by a chloride, a nitrate, a sulfate, an alkoxy compound or the like by the use of any of said coaters, and thereafter subjecting the resulting coat to drying treatment. The drying treatment temperature may be room temperature without specific limitation in the case of the method (I), but is usually in the range of 80 to 120° C. in the case of the method (II), since the silicate is formed simultaneously with the drying treatment. The thickness of the coat layer is determined usually in the range of 0.1 to 10 μm.

On the other hand in the case of mixing the silicate in the substrate or the adhesive layer, it is preferable to use the desired metal silicate which has been prepared in advance. The silicate-containing sheet according to the present invention may be prepared by properly combining at least two procedures from the procedure of coating the substrate with the silicate, the procedure of mixing the silicate in the substrate and the procedure of mixing the silicate in the adhesive layer.

The adhesive layer, when being provided on one side of the substrate in the sheet of the present invention, is usually overlaid with a release sheet. The adhesive to be used for the formation of the adhesive layer is not specifically limited, but may be selected for use from a variety of adhesives such as an acrylic base, a rubber base and silicone base, among which an acrylic base adhesive is preferable because of its superiority in durability and adhesivity.

The acrylic base adhesive usually comprises an acrylic acid ester wherein the alkyl group has 4 to 15 carbon atoms as a principal ingredient and a small amount of an acrylic base resin produced by copolymerizing an other acrylic monomer and a functional monomer. In general, the acrylic base adhesive includes a solvent type adhesive and emulsion type adhesive. The solvent type adhesive contains in a proper solvent, the aforesaid acrylic base resin, a cross-linking agent, and as desired a tackifying agent and the like; whereas the emulsion type adhesive contains in an aqueous medium, the aforesaid acrylic base resin, an emulsifying agent, and as desired a tackifying agent and the like. The thickness of the adhesive layer is in the range of usually 5 to 100 μm, preferably 10 to 50 μm.

The release sheet is not specifically limited, but may be selected for use from previously well-known sheet such as paper exemplified by glassine paper, coated paper and laminated paper or a variety of plastics, said sheet being coated with a release agent such as silicone resin. The thickness of the release sheet is not specifically limited, but is usually in the range of 25 to 200 μm.

The silicate-containing sheets thus obtained according to the present invention have ultraviolet rays-attenuating properties, and photocatalytic actions such as antimicrobial properties and antifouling properties. Of these, the sheet in which a plastic film is used as the substrate is free from a fear of accelerating the deterioration of the substrate that is caused by the use of titanium dioxide, and accordingly is favorably used in a variety of fields that are required to have the above-mentioned properties and functions.

There is favorably used, as a label, the silicate-containing sheet constituted by using a plastic film as the substrate, placing an adhesive layer on one side thereof and locating a release layer directly on the adhesive layer.

The silicate-containing sheets according to the present invention exhibit the following effects and advantages as described in items (a), (b) and (c).

(a) The silicate-containing sheets to be used in the present invention have ultraviolet ray-attenuating function, antimicrobial action and photocatalytic function. As opposed to a conventional metal oxide such as titanium dioxide, the above-mentioned silicate, when being applied to the substrate, can be incorporated in the coat layer with sufficient adhesivity without placing a binder layer nor mixing with a binder, thereby enabling the silicate-containing sheet to be produced at a low cost.

(b) The silicate to be used in the present invention, as opposed to conventional titanium dioxide and the like, is free from a fear of accelerating the deterioration of plastics, and hence can be applied as such to the plastic substrate and mixed in said substrate as it is. Consequently, it is made possible to supply the silicate-containing plastic sheet at a low price and also to expand its application fields.

(c) The silicate-containing sheets according to the present invention have ultraviolet rays-attenuating properties, and photocatalytic actions such as antimicrobial properties and antifouling properties, and consequently are favorably used as functional sheets in the fields that are required to have the foregoing properties and functions.

In the following, the present invention will be described in more detail with reference to a comparative example and working examples, which however shall not limit the present invention thereto.

Evaluations were made of the performances of the sheets prepared in the under-mentioned comparative example and working examples according to the following procedures.

(1) Antimicrobial Property

The antimicrobial property was visually evaluated by the use of San-Ai biochecker (produced by San-Ai Oil Co., Ltd.). More particularly, a microbial liquid of *Escherichia coli* was added dropwise onto the silicate-coated surface in Examples (titanium-coated surface in Comparative Example 1) of the silicate-containing sheet in Examples (titanium-containing sheet in Comparative Example 1), and evaluations were made of the microbial state at 25° C. after the lapse of 24 hours by means of the biochecker.

(2) Deterioration State of Sheet on Irradiation of Ultraviolet Rays

Sheets that were the objects of the test were irradiated with ultraviolet rays for 500 hours by means of a weatherometer. Evaluations were made of the deterioration state of sheets by visually observing the shapes of the sheets on the basis of the following criteria, wherein the ultraviolet rays were applied to the silicate-containing sheets from the silicate-coated side in Examples 1 to 8; to the titanium dioxide-containing sheets from the titanium dioxide-coated side in Comparative Example 1; and to the silicate-containing sheets from the side of the adhesive layer containing silicate in Example 9.

○: no abnormality

×: deteriorated

Δ: somewhat deteriorated (3) Effect of Photocatalytic Action on Surface State

The silicate-containing sheets in Examples and the titanium dioxide-containing sheet in Comparative Example 1 were located outdoors so that the silicate (titanium dioxide in Comparative Example 1)—coated layers were directly exposed to the sunlight, and thereafter small amounts of domestic salad oil was added dropwise to the coated layers. Evaluations were made of the surface state by visually observing the change in the surface state of the coated layers after the lapse of 72 hours on the basis of the following criteria.

○: salad oil hardly remains, exhibiting antifouling function

Δ: salad oil remains in a small amounted, showing inferior antifouling function

(4) Ultraviolet Ray-Attenuating Properties

Sheets that were the objects of the test were irradiated with ultraviolet rays having a wavelength in the range of 300 to 500 nm from the irradiation direction same as that in the preceding item (2). Thus a measurement was made of the transmissivity of the ultraviolet rays by the use of "MPC 3100" (produced by Shimadzu Corporation). The transmissivity for each of the sheets was represented by the percentage (%) on the basis of the transmissivity for a polyethylene terephthalate film of 50 $\mu$m in thickness processed with an self-adhesive free from a silicate which was regarded as 100%. It means that the lower the transmissivity, the higher the ultraviolet rays-attenuating property.

EXAMPLE 1

A polyethylene terephthalate film having a thickness of 50 $\mu$m was immersed in an aqueous solution at 40° C. of sodium hydroxide in a concentration of 5% by weight for a period of 5 minutes to carry out a surface treatment, washed with water, and then dried.

Subsequently, one side of the surface-treated polyethylene terephthalate film was coated with a solution of tetramethoxysilane in isopropyl alcohol in a concentration of 50% by weight so as to obtain a dry film thickness of 0.5 $\mu$m approx. Thereafter, the coated film was dried at 100 to 120° C. for several minutes to form a silica coating having favorable adhesivity to the film. In addition, the resultant silica coating was coated with a solution of a mixture of tetramethoxytitanium and silicic acid at a ratio by weight of 10:1 in isopropyl alcohol in a concentration of 5% by weight so as to obtain a dry film thickness of 1 $\mu$m approx. Thereafter, the coated film was dried at 100° C. for 5 minutes to form a coat layer of titanium silicate.

Moreover, an adhesive layer comprising an acrylic base adhesive in a thickness of 15 $\mu$m was formed on the other side of the coated film, and further on the resultant adhesive layer was laminated a polyester-based release film in a thickness of 38 $\mu$m so as to form an objective titanium silicate-containing sheet. The performances of the resultant sheet are given in Table 1.

EXAMPLE 2

A polyethylene terephthalate film having a thickness of 50 $\mu$m was immersed in an aqueous solution at 40° C. of sodium hydroxide in a concentration of 10% by weight for a period of 1 minute to carry out a surface treatment, washed with water, and then dried.

Subsequently, one side of the surface-treated polyethylene terephthalate film was coated with a solution of a mixture of tetramethoxytitanium and silicic acid at a ratio by weight of 10:1 in isopropyl alcohol in a concentration of 5% by weight so as to obtain a dry film thicknes of 1 $\mu$m approx. Thereafter, the coated film was dried at 100° C. for 5 minutes to form a coat layer of titanium silicate.

Moreover, an adhesive layer comprising an acrylic base adhesive in a thickness of 15 $\mu$m was formed on the other side of the coated film, and further on the resultant adhesive layer was laminated a polyester-based release film in a thickness of 38 $\mu$m so as to form an objective titanium silicate-containing sheet. The performances of the resultant sheet are given in Table 1.

EXAMPLE 3

The procedure in Example 2 was repeated to form a titanium silicate-containing sheet except that tetraethoxysilane was used in place of silicic acid. The performances of the resultant sheet are given in Table 1.

EXAMPLE 4

The procedure in Example 2 was repeated to form a titanium silicate-containing sheet except that the polyethylene terephthalate film was immersed in an aqueous suspension wherein water dispersion type titanium dioxide in an amount of 5% by weight was dispersed, and then irradiated with ultraviolet rays for 10 minutes by means of a ultraviolet rays irradiating machine to carry out surface treatment instead of that the polyethylene terephthalate film was immersed in an aqueous solution of sodium hydroxide in a concentration of 10% by weight for a period of 1 minute. The performances of the resultant sheet are given in Table 1.

EXAMPLE 5

The procedure in Example 2 was repeated to form a tin silicate-containing sheet except that tin chloride was used in place of tetramethoxytitanium. The performances of the resultant sheet are given in Table 1.

EXAMPLE 6

The procedure in Example 2 was repeated to form a zinc silicate-containing sheet except that zinc chloride was used in place of tetramethoxytitanium. The performances of the resultant sheet are given in Table 1.

EXAMPLE 7

The procedure in Example 2 was repeated to form a titanium silicate-containing sheet except that tetraethoxytitanium was used in place of tetramethoxytitanium. The performances of the resultant sheet are given in Table 1.

EXAMPLE 8

The procedure in Example 2 was repeated to form a cerium silicate-containing sheet except that cerium chloride was used in place of tetramethoxytitanium. The performances of the resultant sheet are given in Table 1.

EXAMPLE 9

A titanium silicate-containing adhesive was prepared by mixing 10 parts by weight of titanium silicate which had been prepared in advance in 100 parts by weight of an adhesive composed of a copolymer consisting of 95% by weight of butyl acrylate and 5% by weight of acrylic acid. Subsequently, the titanium silicate-containing adhesive thus obtained was applied to one side of a polyethylene terephthalate film having a thickness of 50 $\mu$m so as to form a coating amount of 20 g/m$^2$. Thus, a titanium silicate-containing sheet was prepared, the performances of which are given in Table 1.

COMPARATIVE EXAMPLE 1

A polyethylene terephthalate film having a thickness of 50 $\mu$m was immersed in an aqueous solution at 40° C. of sodium hydroxide in a concentration of 5% by weight for a period of 5 minutes to carry out a surface treatment, washed with water, and then dried.

Subsequently, one side of the surface-treated polyethylene terephthalate film was coated with a solution of a mixture of tetraethoxysilane and titanium dioxide at a ratio by weight of 10:1 in isopropyl alcohol in a concentration of 5% by weight so as to obtain a dry film thicknes of 1 $\mu$m approx. Thereafter, the coated film was dried at 100° C. for 5 minutes to form a titanium dioxide-coat layer containing the binder.

Moreover, a adhesive layer comprising an acrylic base adhesive in a thickness of 15 $\mu$m was formed on the other side of the film, and further on the resultant adhesive layer was laminated a polyester-based release film in a thickness of 38 $\mu$m so as to form an objective titanium dioxide-containing sheet. The performances of the resultant sheet are given in Table 1.

TABLE 1

|  | Anti-microbial properties | Deterioration state of film on irradiation of UV rays | Effect of photo-catalytic action on surface state | UV rays-attenuating properties (transmissivity) (%) | | | |
|---|---|---|---|---|---|---|---|
|  |  |  |  | 320 nm | 340 nm | 360 nm | 380 nm |
| Example 1 | good | ○ | ○ | 1 | 3 | 5 | 45 |
| Example 2 | good | Δ | ○ | 2 | 3 | 4 | 50 |
| Example 3 | good | ○ | ○ | 1 | 3 | 5 | 49 |
| Example 4 | good | ○ | ○ | 2 | 3 | 4 | 50 |
| Example 5 | best | ○ | Δ | 37 | 55 | 63 | 68 |
| Example 6 | best | ○ | Δ | 2 | 3 | 5 | 55 |
| Example 7 | good | ○ | ○ | 2 | 3 | 5 | 51 |
| Example 8 | good | ○ | ○ | 5 | 5 | 10 | 70 |
| Example 9 | — | ○ | — | 1 | 3 | 5 | 45 |
| Comp. Example 1 | good | x | ○ | 3 | 5 | 5 | 50 |

[Remarks] Comp. Example: Comparative Example

What is claimed is:

1. A silicate coated sheet, which comprises:
a plastic film having been surface-treated on one side and a coating of a silicate of one metal or at least two composite metals on the surface treated side, said metal or metals being selected from the group consisting of Ti, Zn, Sn and Ce.

2. The silicate coated sheet according to claim 1, wherein the metal or metals is selected from the group consisting of Ti and Ce.

3. The silicate coated sheet according to claim 1, the plastic film has been surface-treated by a method in which the film surface is polarized by a chemical or physical method.

4. The silicate coated sheet according to claim 1, which comprises a plastic film coated on one side with said silicate and provided with an adhesive layer on another side of the plastic film.

* * * * *